US006757821B1

(12) United States Patent
Akiyama et al.

(10) Patent No.: US 6,757,821 B1
(45) Date of Patent: Jun. 29, 2004

(54) COMPUTER SYSTEM AND ITS OPERATION ENVIRONMENT SWITCHING METHOD

(75) Inventors: Kazuhiro Akiyama, Hachioji (JP); Ryoichi Sebori, Fussa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/537,751

(22) Filed: Mar. 30, 2000

(30) Foreign Application Priority Data

Apr. 28, 1999 (JP) ............................................ 11-121695

(51) Int. Cl.[7] .............................................. G06F 9/00
(52) U.S. Cl. ....................................... 713/100; 713/1
(58) Field of Search ....................... 713/1, 100; 707/10; 345/333

(56) References Cited

U.S. PATENT DOCUMENTS 5,897,635 A  *  4/1999  Torres et al. .................. 707/10
5,905,492 A  *  5/1999  Straub et al. ................ 345/744
6,269,371 B1 *  7/2001  Ohnishi ........................ 707/10
6,493,751 B1 * 12/2002  Tate et al. .................... 709/221

OTHER PUBLICATIONS

MandrakeSoft, "Linux–Mandrake: User Guide and Reference Manual", Jan. 2000, p. 18.*
Caesar, "The K Desktop Environment 1.1", Mar. 25, 1999.*
Zisman Alan, "Using Poledit: Policy Editor to help secure Windows 95/98 computers," 1999, pp. 2–6.*
http://www.cnw.com/~josh/tweakui/tweakui.html, "Tweak UI v1.25", 1998.*
Minasi, Mark. "The Expert Guide to Windows 95." 1996, pp. 238–239,242–243,247 and 249.*
McFedries, Paul. "The Complete idiots Guide to Windows 95 Second Edition." 1997, p. 284.*
zman. "Re: Two sets of user preference for Office 97 on Win95." Mar. 4, 1997.*
Zisman, Alan. "Using Poledit: Policy Editor to help secure Windows 95/98 computers." 2002.*
"Server enforced System Policies (POLEDIT)." Mar. 5, 2001, p. 2.*

* cited by examiner

Primary Examiner—Jeffrey Gaffin
Assistant Examiner—Mark Connolly
(74) Attorney, Agent, or Firm—Finnegan, Henderson, Farabow, Garrett & Dunner, L.L.P.

(57) ABSTRACT

An environment switching program has a function of saving/resetting some or all combinations of machine setups. More specifically, an environment at an arbitrary timing designated by the user is acquired from a registry, and is saved in an environment setting information database (DB). When the user inputs a switching request, the saved environment is written back to the registry. Hence, once the user sets up operation environments in units of use patterns such as use in an office, use at a visit place, or use at home, he or she can repetitively use those setups by reconstituting them as needed.

9 Claims, 10 Drawing Sheets

| DB | BROWSER SETTING INFORMATION | NETWORK SETTING INFORMATION | DIAL-UP SETTING INFORMATION | SCREEN SETTING INFORMATION | POWER SAVING SETTING INFORMATION | ......... |
|---|---|---|---|---|---|---|
| MODE A | ◯ | ◯ | | ◯ | | |
| MODE B | ◯ | ◯ | ◯ | ◯ | | |
| MODE C | ◯ | ◯ | ◯ | ◯ | ◯ | |
| ⋮ | ⋮ | ⋮ | ⋮ | ⋮ | ⋮ | ⋮ |

COMPUTER SYSTEM AND ITS OPERATION ENVIRONMENT SWITCHING METHOD

CROSS-REFERENCE TO RELATED APPLICATION

This application is based upon and claims the benefit of priority from the prior Japanese Patent Application No. 11-121695, filed Apr. 28, 1999, the entire contents of which are incorporated herein by reference.

BACKGROUND OF THE INVENTION

The present invention relates to a computer system, the operation environment of which is set on the basis of environment setting information, and its operation environment switching method.

In recent years, as the functions of personal computers improve, the number of environment setting items, such as a network, browser, dial-up, screen, power saving, and the like, whose setups the user can change according to his or her favor or as needed is greatly increasing. However, it is becoming harder for a novice user to recognize an environment setting item to be rewritten and how to rewrite it, since vendors and tools vary in units of environment setting items.

A compact, lightweight, so-called mobile personal computer cannot exhibit its 100% performance according to its features unless its operation environment is optimally set up wherever the user goes. However, every time the use pattern is changed (e.g., switching from use at a visit place to that in an office), it is troublesome for the user to individually change the setups of a large number of environment setting items, and such operations are difficult for a novice user. Hence, the user must compromise to use the personal computer with minimum required setups applicable everywhere he or she uses it, and special functions cannot be effectively used.

As described above, conventionally, since the user must change the setups of each environment setting item using a dedicated setting tool in units of environment setting items, he or she cannot immediately change the setups of an operation environment of the personal computer consisting of a large number of environment setting items. For this reason, even a machine like a mobile personal computer, the operation environment of which is preferably changed in correspondence with various use patterns, is often used in a certain setup state only, and the performance of that personal computer cannot be fully utilized.

BRIEF SUMMARY OF THE INVENTION

The present invention has been made in consideration of the above situation, and has as its object to provide a computer system, which can change the setups of a plurality of environment setting items, and can easily change the setups of an operation environment in correspondence with various use patterns or favor, and its operation environment switching method.

In order to achieve the above object, according to the first aspect of the present invention, there is provided a computer system comprising:

means for previously storing a plurality of environment setting information which is used for setting an environment of the computer system in a data base at each operation environment mode; and means for setting one of the plurality of environment setting information which is stored in the data base in the computer system in response to a request for switching the environment of the computer system, wherein the one of the plurality of environment setting information is designated.

Also, according to the second aspect of the present invention, there is provided a method of switching an operation environment of a computer system, comprising:

previously storing a plurality of environment setting information which is used for setting an environment of the computer system in a data base at each operation environment mode; and setting one of the plurality of environment setting information which is stored in the data base in the computer system in response to a request for switching the environment of the computer system, wherein the one of the plurality of environment setting information is designated.

Furthermore, according to the second aspect of the present invention, there is provided a computer readable medium on which a program is recorded, the program comprising:

means for previously storing a plurality of environment setting information which is used for setting an environment of the computer system in a data base at each operation environment mode; and means for setting one of the plurality of environment setting information which is stored in the data base in the computer system in response to a request for switching the environment of the computer system, wherein the one of the plurality of environment setting information is designated.

With this computer system, since the user can save and reset setting information of a plurality of operation environment setting items, he or she can easily change the setups of an operation environment in correspondence with various use patterns or his or her favor. Therefore, once the user sets up operation environments in units of use patterns such as use in an office, use at a visit place, or use at home, he or she can repetitively use those setups by reconstituting them as needed. Also, since the user can record an actual operating state at a given timing, even when he or she makes setups that may disturb operations of the computer due to his or her own operation errors, he or she can easily revert to the state before the wrong setups.

Also, when the user saves a plurality of environments in units of modes, he or she can switch the environment to an arbitrary one of the saved modes. Hence, the user can use the computer while easily switching a plurality of modes, and can fully exhibit the performance of the computer system in every use patterns.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of the present invention will be described hereinafter with reference to the accompanying drawings.

Figure 1A:
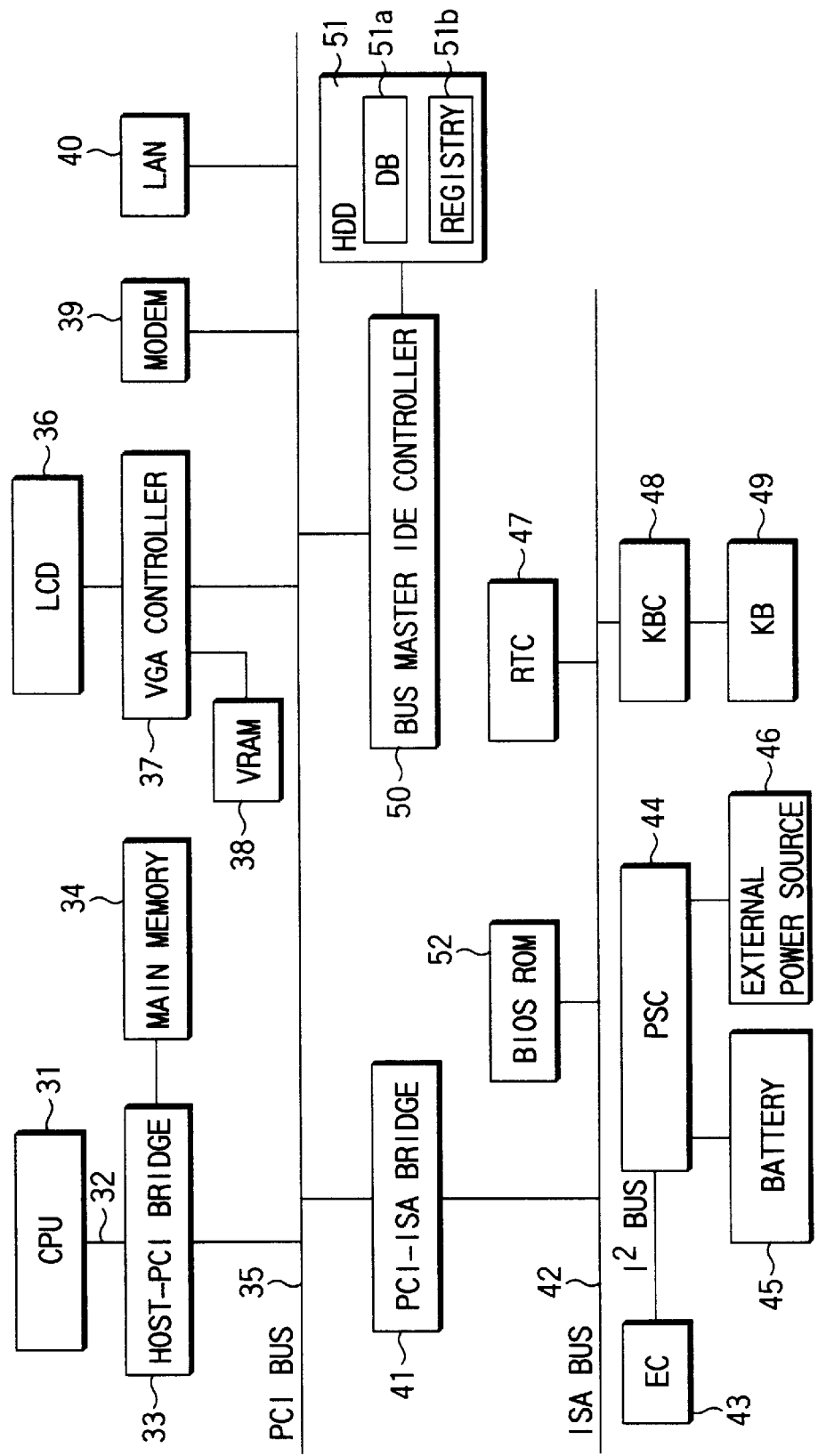
FIG. 1A is a view showing a hardware of the computer system to which the environment switching method is applied.

FIG. 1A is a block diagram showing the hardware arrangement of a personal computer that implements an environment switching method according to an embodiment of the present invention.

As shown in FIG. 1A, a CPU 31, a host-PCI bridge 33 for bridging between a CPU bus 32 and PCI bus 35, a main memory 34, an LCD 36, a VGA controller 37, a VRAM (video RAM) 38, a modem 39, a PCI-ISA bridge (PCI/ISA BUS-Bridge) 41, a bus master IDE controller 50, a hard disk drive 51, a BIOS-ROM 52, a real time clock (RTC) 47, an embedded controller (EC) 43, a power source controller (PSC) 44, a keyboard controller (KBC) 48, and the like are provided on a system board of this computer. The PCI bus 35 is connected to a LAN 40.

The CPU 31 controls the operations of the overall system and executes data processes in accordance with various control programs stored in the BIOS-ROM 52, various programs loaded from the HDD 51 onto the main memory 34, and the like.

In this embodiment, the CPU 31 executes an environment switching program which is loaded from the HDD 51 onto the main memory 34 and makes processes shown in FIGS. 6, 7, 13, and 14.

The host-PCI bridge 33 incorporates a circuit for controlling memories and all I/O devices in the system.

The main memory 34 is used as a main storage of this system, i.e., a system memory, and stores an operating system, an application program to be processed, user data created by the application program, and the like.

The VGA controller 37 controls the LCD 36 used as a display monitor of this system, and displays window data rendered in the VRAM 38 on the LCD 36 in an LCD panel unit. In this case, windows shown in FIGS. 4, 5, 8 to 11, and 15 are displayed under the control of the CPU 31 in accordance with the environment switching program.

The PCI-ISA bridge 41 is a bus bridge that bridges between the PCI bus 35 and ISA bus 42. The bus master IDE controller 50 controls IDE devices (the HDD 51 in this embodiment) mounted on the computer main body, and is compatible with a bus master function that can implement DMA transfer between the IDE devices and main memory 34. The BIOS-ROM 52 stores a system BIOS, and comprises a flash memory so that programs can be rewritten. The RTC 47 is a timepiece module, and has a CMOS memory backed up by a dedicated battery. In this CMOS memory, various kinds of system configuration information including information for designating a power-up mode and the like are set.

The EC 43 is a controller for controlling additional functions of the system, and has a power source sequence control function, power status monitoring function, and the like, which control the ON/OFF states of the system power source in cooperation with the power source controller 44. The EC 43 communicates with the power source controller 44 via an I²C bus. The power source controller 44 is connected to the EC 43 via the I²C bus, and controls a battery 45 and the external power source 46. The keyboard controller 48 makes key input control of a keyboard (KB) 49.

The HDD 51 is used as a secondary storage of the computer, and comprises a database (DB) 51a which is set and used by the environment switching program of this embodiment and saves operation environment setting information in units of a plurality of operation environment setting items, and a registry 51b of the OS, which stores operation environment setting information required for the operation environment setups of the personal computer.

Figure 1B:
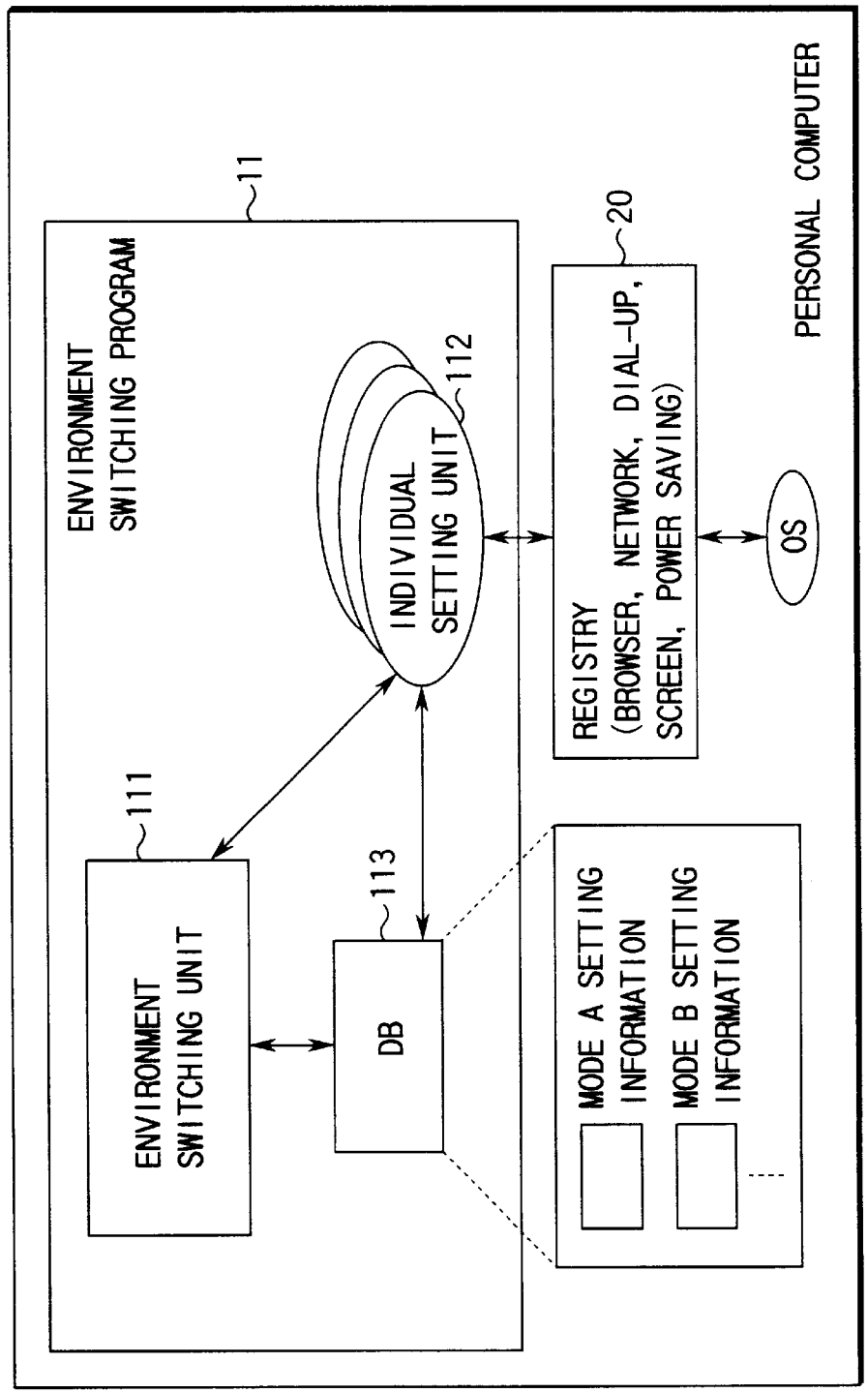
FIG. 1B is a block diagram showing the arrangement of a personal computer to which an operation environment switching method according to an embodiment of the present invention is applied.

FIG. 1B shows the block diagram of a personal computer to which an operation environment switching method according to an embodiment of the present invention is applied.

This personal computer is a notebook or sub-notebook type mobile computer, the operation environment of which can be variously set and changed in accordance with operation environment setting information. In general, operation environment information of a personal computer is stored in a storage medium inside a machine such as a registry of an OS, a CMOS memory managed by a BIOS, or the like. In the following description, assume that the operation environment information setups are stored in only the registry for the sake of simplicity.

A registry 20 holds operation environment setting information required for setting the operation environment of a personal computer. The registry 20 corresponds to the registry 51b in the HDD 51 as shown in FIG. 1A. The operation environment setting information consists of a plurality of operation environment setting items, the setups of which can be individually changed, such as setting information pertaining to a browser setup, a network (LAN) setup, a dial-up network setup, a screen setup, a power saving setup, and the like. Environments that can be set by these operation environment setting items are as follows:

A. Browser Setup
  proxy setup
  dial-up network setup name used
  start page
  connection method (via LAN or use of modem)
B. Network Setup
  TCP/IP setup
  network group name, computer name, login name, login method
  connected states of network resources (drive, printer)
C. Dial-up Network Related Setup
  setup of source (modem used, communication hardware, type of line)
  setup of destination (server to which personal computer is to be connected, and connection method)
D. Screen Related Setup
  screen resolution, color depth, wallpaper, pattern
  setup and file name of desktop theme to be applied
E. Power Saving Setup
  setup upon using AC, setup upon battery driving.

In this embodiment, operation environment switching of the personal computer is implemented by an environment switching program 11 which runs on that personal computer. The environment switching program 11 has a function of simultaneously saving and resetting some or all combinations of the aforementioned machine setups. More specifically, the program 11 simultaneously saves an environment at an arbitrary timing designated by the user, and executes a process for resetting the saved environment upon receiving switching request from the user. The environment switching program 11 comprises an environment switching unit 111, a plurality of individual setting units 112, and an environment setting information database (DB) 113. The environment switching unit 111 and the plurality of individual setting units 112 are resident in the main memory 34 and are used by the CPU 31.

The environment switching unit 111 controls the individual setting units 112 in accordance with a user instruction. The individual setting units 112 are provided in correspondence with the operation environment setting items. Using these individual setting units 112, a process for acquiring setting information of some or all of operation environment setting items of the current operation environment setting information from the registry 20, and simultaneously recording them in the environment setting information database (DB) 113, a process for writing back setting information saved in the environment setting information database (DB) 113 in the registry 20, and the like can be executed. These individual setting units 112 are implemented as individual modules such as dynamic link libraries (DLLs). Namely, CPU 31 acquires the setting information in the operation environment setting items from the registry 51b or stores setting information which is obtained from the data base 51a in the HDD 51, in accordance with individual setting units 112 of the environment switching program 11 which is loaded into the main memory 34.

The environment switching program 11 is normally used as follows.

(1): The environment of the personal computer is set up according to its use method or user's favor (this process is implemented when the user sets individual operation environment setting items using dedicated individual setting tools provided by the OS or vendors).

(2): If the currently setup environment is preferable for the user, and the personal computer runs normally in that setup state, the user can save and re-use the setup contents. In other words, if an environment that the user wants to save is set up, the user can launch the environment switching program 11. The environment switching program 11 acquires the current setting contents respectively corresponding to a plurality of operation environment setting items from the registry 20, and simultaneously saves them in the environment setting information database (DB) 113.

(3): By repeating (1) and (2), a plurality of combinations of machine setups (to be referred to as a mode hereinafter) the user wants to use are saved in the environment setting information database (DB) 113 in units of modes (mode A setting information, mode B setting information).

(4): Environment switching of the personal computer is implemented by selecting a mode to be reconstituted from those saved in (1) to (3), and writing back the setting information corresponding to the selected mode to the registry 20.

Figures 2, 3:
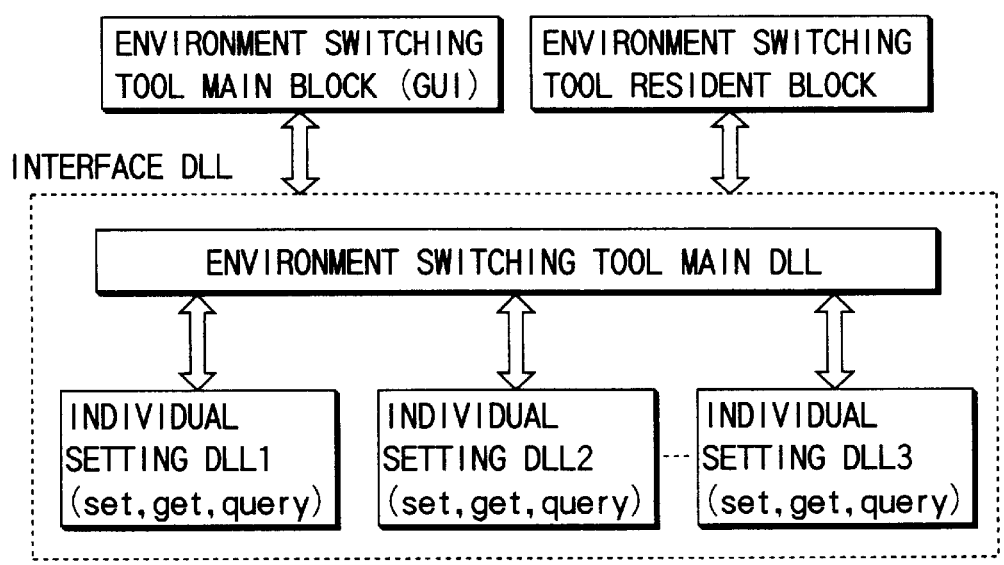
FIG. 2 is a table showing an example of the contents of an environment setting information database used in the embodiment shown in FIGS. 1A and 1B.
FIG. 3 is a diagram showing an example of the software structure of an environment switching program used in the embodiment shown in FIGS. 1A and 1B.

As described above, the environment setting information database (DB) 113 saves setting information of required operation environment setting items in units of modes. FIG. 2 shows an example of the contents of the environment setting information database (DB) 113.

Referring to FIG. 2, a setting information group pertaining to browser, network, and screen setups is saved as "mode A", a setting information group pertaining to browser, network, dial-up, and screen setups is saved as "mode B", and a setting information group pertaining to browser, network, dial-up, screen, and power saving setups is saved as "mode C". The user can designate setting information of an operation environment setting item to be saved in units of modes. When the setting information group of "mode A" is written back to the registry 20, setting information which pertains to a dial-up setup and that which pertains to a power saving setup use setups before environment switching.

Since information of each of "mode A", "mode B", and "mode C" is saved on the basis of environment setting information used while the personal computer is actually running, even when the user makes wrong setups that may disturb startup of the personal computer, a normal operation environment can be easily recovered on the basis of the information of "mode A", "mode B", or "mode C". Also, when operation environments suitable for use in an office, use at a visit place, and use in the home are respectively saved as "mode A", "mode B", and "mode C", an optimal environment can be immediately set in correspondence with the use pattern of the personal computer.

FIG. 3 shows an example of the structure of the environment switching program 11.

As shown in FIG. 3, the environment switching program 3 has a three-layered structure. The uppermost layer (environment switching tool main block, environment switching tool resident block) provides a user interface, the middle layer corresponds to a main DLL (environment switching tool main DLL) as a group of service routines of the environment switching program itself, and the lowermost layer includes an individual setting DLL group for controlling individual setups such as a browser setup, network (LAN) setup, dial-up setup, screen setup, and power saving setup.

The environment switching tool main block and environment switching tool main DLL correspond to the environment switching unit 111 shown in FIG. 1B, and the individual setting DLL group to the individual setting units 112 shown in FIG. 1B.

The individual setting DLLs implement functions such as "set", "get", "query", and the like in accordance with instructions from the environment switching tool main DLL. The function "get" is used to, e.g., acquire setting information from the registry 20, and the function "set" is used to set contents recorded in the environment setting information database (DB) 113 in the registry 20. Furthermore, the function "query" is used to inquire of the OS or the like as to whether or not the setups of the registry 20 can be changed.

The environment switching tool main block handles the environment switching tool main DLL and individual setting DLLs as a single interface DLL.

Figure 4:
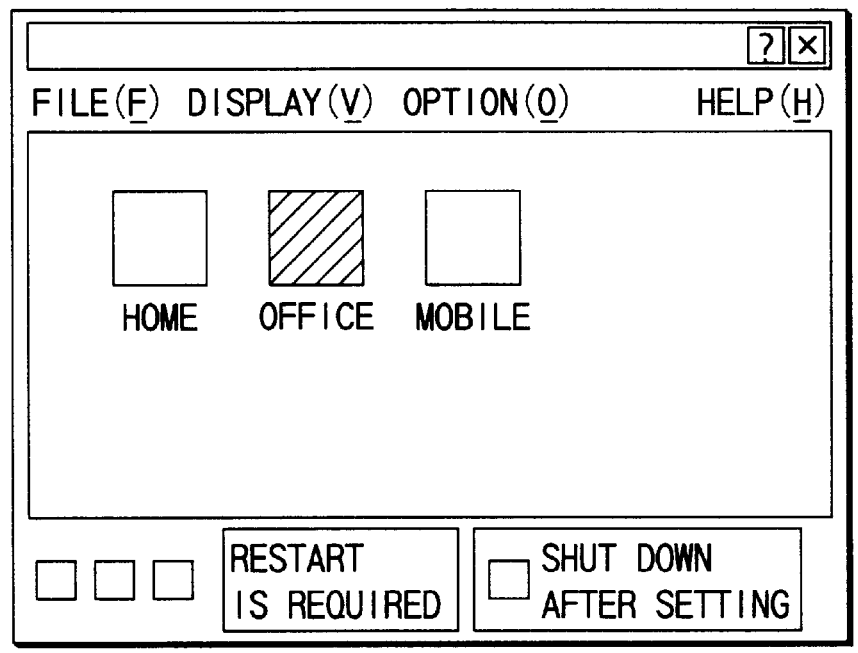
FIG. 4 shows an example of a main window presented by the environment switching program used in the embodiment shown in FIGS. 1A and 1B.
Figure 5:
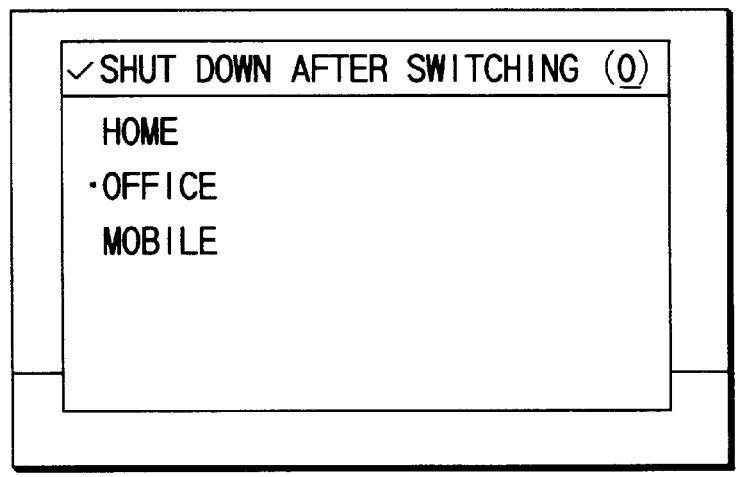
FIG. 5 shows an example of a menu window presented by the environment switching program used in the embodiment shown in FIGS. 1A and 1B.

FIGS. 4 and 5 show examples of the display windows of the environment switching tool main block and environment switching tool resident block.

Each of icons with names "home", "office", and "mobile" displayed near the center portion of the display window in FIG. 4 indicates the previously saved environment setting information of the personal computer in units of modes.

On the lower left portion of the window in FIG. 4, small icons indicating operation environment setting items saved as the currently selected mode "office" are displayed. A message "restart is required" besides these small icons indicates that the personal computer must be restarted when the current mode is switched to the mode "office". This message automatically changes depending on the modes before and after switching. For example, even when the mode is switched to "office", if the mode is switched from "home", the personal computer has to be restarted, but if the mode is switched from "mobile", it may not have to be restarted. In this case, the message changes to another one, e.g., "application must be re-executed".

A lower right portion "shut down after setup" in the display window in FIG. 4 is a check box, with which the user can designate whether or not the personal computer is automatically shut down after the setups are changed by the environment switching program 11. For example, when the user uses the personal computer at home, and switches it to the mode "office" before he or she leaves home, it is preferable if the personal computer automatically shuts itself down after the mode is changed. In this case, the user can check the check box.

In a conventional setting tool, when the user has changed setups that require restart, he or she must select "NO" on a message that prompts to restart the personal computer, and then must manually shut down the personal computer. However, in this embodiment, the personal computer can be automatically shut down, as described above.

The contents of a menu on the display window in FIG. 4 are as follows:

1. File (F)
   switch (C): switch to the selected (highlighted) mode
   create new mode (N): save current setups of the personal computer to create a new mode
   create shortcut (S): create a shortcut for switching to the selected mode
   delete mode (D): delete the selected mode
   property (R): display and change the name, comment, and icon of the mode or display and change the saved contents
   quit (X): quit the program
2. Display (V)
   large icon (G): select the display format of a large icon display (FIG. 4)
   details (D): display in the list format that also displays a comment
   display in task tray (T): switch whether or not the resident icon function shown in FIG. 5 is used
3. Option (O)
   end after switching (E): set whether or not the environment switching program 11 is to end after the setups are switched.

The flow of the process of the environment switching program 11 will be explained below.

Acquire/save Operation Environment Setting Information

Figure 6:
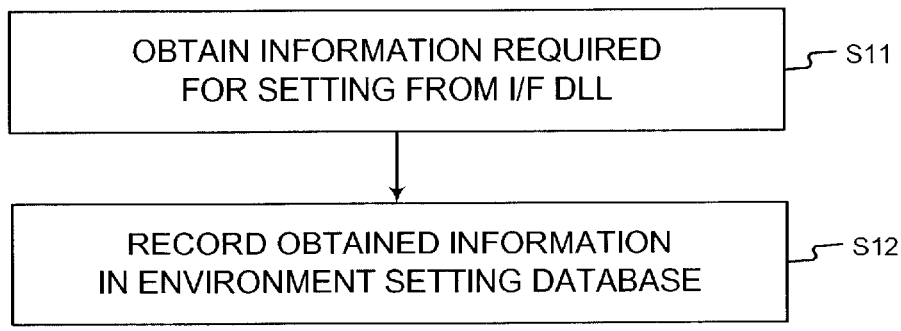
FIG. 6 is a flow chart showing the sequence of an acquisition/saving process of operation environment setting information in the embodiment shown in FIGS. 1A and 1B.

When the user requests to save the current operation environment setting information, the environment switching tool main block acquires the current operation environment setting information from the registry 20 using the interface DLL (step S11), as shown in the flow chart in FIG. 6. In this case, each individual setting DLL acquires setting information in units of required operation environment setting items. The environment switching tool main block simultaneously records setting information corresponding to each of the acquired operation environment setting items in the environment setting information database (DB) 113 as setting information of a predetermined mode having a name designated by the user (step S12).

Switch Operation Environment

Figure 7:
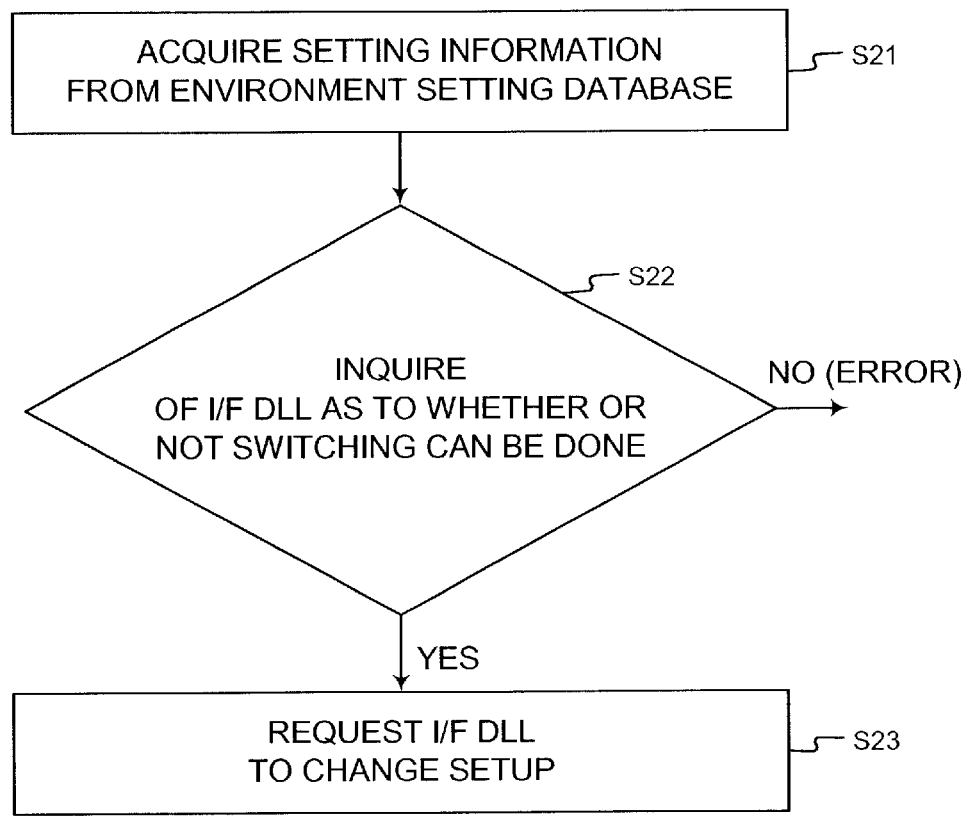
FIG. 7 is a flow chart showing the sequence of an operation environment switching process in the embodiment shown in FIGS. 1A and 1B.

When the user requests to switch the current environment to that of another mode that has already been saved, the environment switching tool main block selects setting information corresponding to the mode after switching from a plurality of modes saved in the environment setting information database (DB) 113, and acquires the setting information corresponding to the selected mode from the environment setting information database (DB) 113 (step S21), as shown in the flow chart in FIG. 7.

The environment switching tool main block inquires of the interface DLL as to whether or not the acquired operation environment setting items can be changed (step S22). In this case, the environment switching tool main DLL inquires of each individual setting DLL corresponding to an item that must be switched as to whether its setup can be changed, and returns the result to the environment switching tool main block.

If setups can be changed, the environment switching tool main block instructs the interface DLL to save the information acquired from the environment setting information database (DB) 113 in the registry 20, thus changing the contents of the registry 20 (step S23). In this manner, the personal computer recovers an environment corresponding to the mode designated by the user.

In this embodiment, assume that all pieces of setting information are stored in the registry 20 for the sake of simplicity. However, highly model-dependent setting information such as information pertaining to a power saving setup is often recorded at a specific location different from other kinds of information. In this embodiment, since individual setting DLLs are provided in units of operation environment setting items, an individual setting DLL corresponding to the power saving setup can be prepared in units of models. Hence, the present invention can cope with various models without rewriting the entire program. In this embodiment, an API (Application Programming Interface) with the environment switching tool main block is designed to be common to every power saving schemes. Hence, the environment switching tool main block need only save data obtained from the interface DLL and pass that data on to the interface DLL regardless of the contents of the power saving setup.

Figure 8:
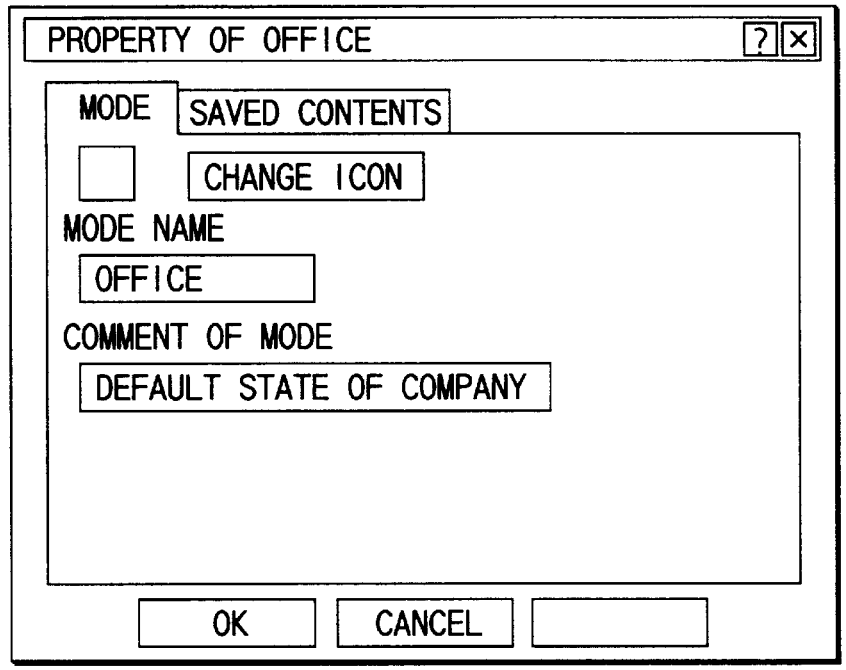
FIG. 8 shows an example of a saving mode information confirmation window used in the embodiment shown in FIGS. 1A and 1B.
Figure 9:
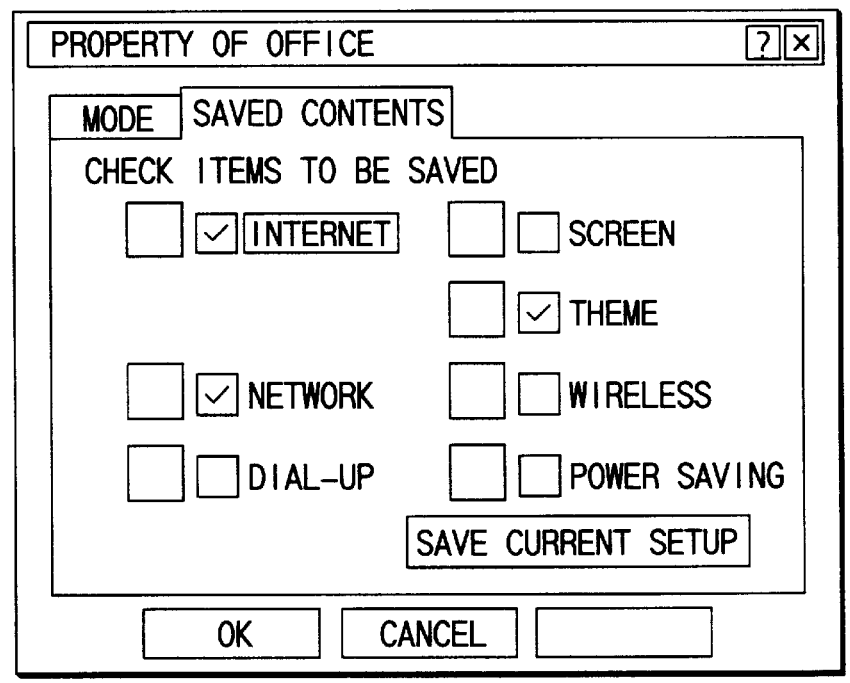
FIG. 9 shown an example of a saving item designation window used in the embodiment shown in FIGS. 1A and 1B.

FIGS. 8 and 9 show examples of the environment switching setting window that the user actually operates.

FIG. 8 shows the window, which is used for the user's convenience to take a note of the use purpose of the setting contents. The mode name, comment, and icon can be arbitrarily designated.

FIG. 9 shows the window which is used to designate items to be saved. Using check boxes corresponding to items, the user can select arbitrary ones of a plurality of items that can be set. Note that an "internet" icon corresponds to a setting item that pertains to a browser. Since some setting items require restarting the machine to complete their setting change processes (e.g., a network setup), and some setting items are not necessary for a given user, the user can freely select an arbitrary combination of setting items.

Environment Switching Method

This embodiment provides the following four switching methods.

1. Main window: the user selects and double-clicks an icon corresponding to the mode to which the personal computer is to be switched, on the window shown in FIG. 4, or select "switch" from the menu on the window in FIG. 4.

2. The user selects the mode to which the personal computer is to be switched, on the resident menu shown in FIG. 5.

Figure 10:
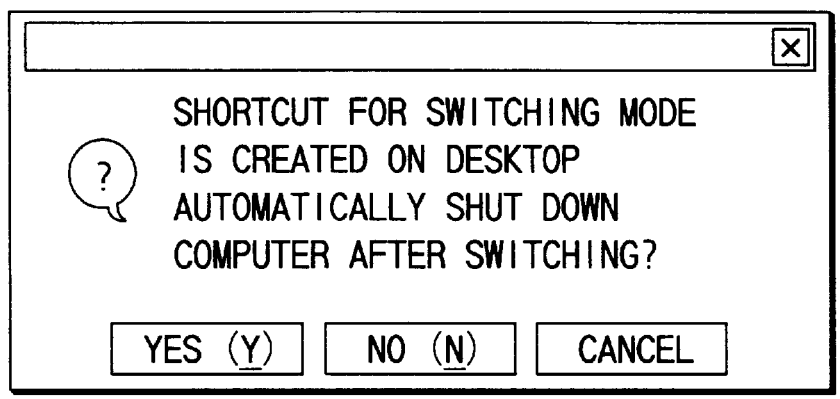
FIG. 10 shows a shortcut generation dialog used in the embodiment shown in FIGS. 1A and 1B.

3. The user creates a mode switching shortcut, and double-clicks it or registers and uses it in a program launching tool called a launcher. As described above, the menu of the main block has a function of creating a shortcut. At this time, the user can instruct to unconditionally shut down the personal computer after switching (FIG. 10).

Figure 11:
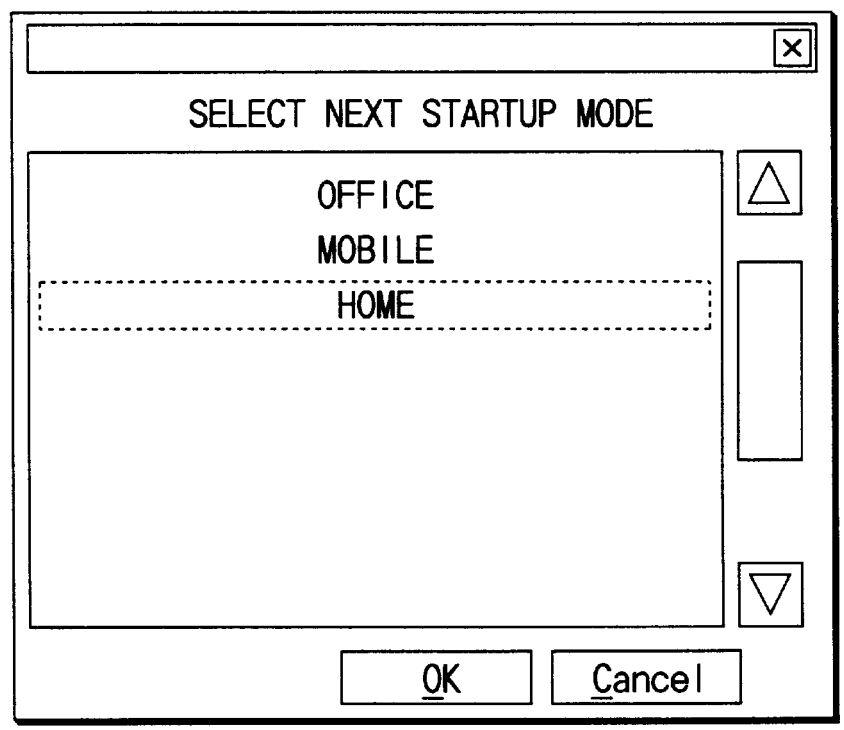
FIG. 11 shows a select menu window upon ending used in the embodiment shown in FIGS. 1A and 1B.

4. A menu is displayed upon quitting the OS, and the user selects a next startup mode (FIG. 11).

Note that the shortcut in method 3. can also be used as follows.

The shortcut function may be combined with a dedicated utility having a function of detecting attachment/detachment of a peripheral device and launching an application program, and when a specific personal computer card is inserted, the setups of the personal computer can be changed to those for that card (e.g., when a video display card is inserted, the screen resolution is changed to a state optimal to that card).

Alternatively, the shortcut function may be combined with a dedicated utility having a function of launching an application program at a specific time or specific time intervals, so as to implement a function of displaying a wallpaper suitable for, e.g., the Christmas eve on the desktop.

An example of switching a proxy setup using the environment switching program 11 of this embodiment will be explained below with reference to FIGS. 12A and 12B.

Figure 12A:
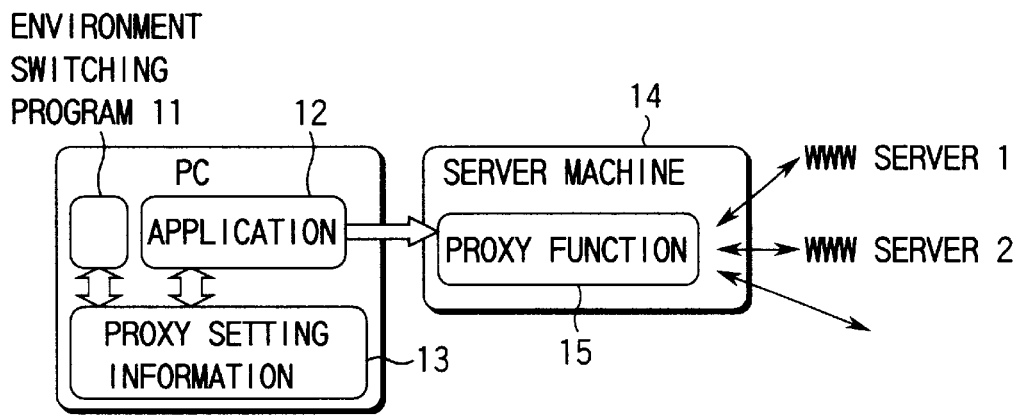
FIG. 12A shown a case wherein the present invention is applied to a normal WWW using a LAN.
Figure 12B:
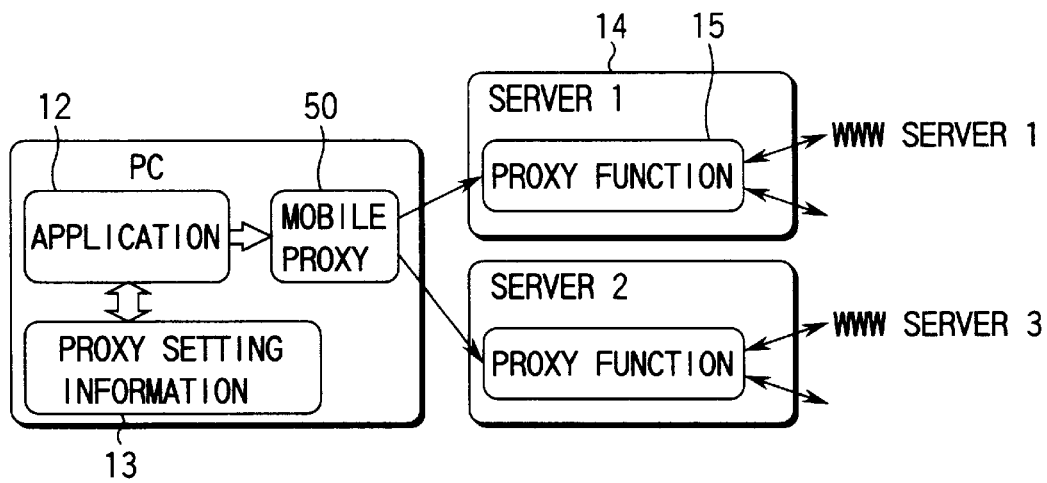
FIG. 12B shows a case wherein the present invention is applied to a mobile-proxy WWW.

FIG. 12A shows a normal WWW browsing arrangement using a LAN. An application program 12 that uses the Internet accesses a distant WWW server by designating a proxy 15 on a server machine 14. In this case, conventionally, when another proxy is to be used, the setup of the application program 12 itself must be changed, or a dedicated application program 50 for switching a proxy called a mobile proxy or the like must be running, as shown in FIG. 12B. In case of FIG. 12B, the application program 12 designates the mobile proxy 50 in place of the proxy of a specific server. That is, the mobile proxy 50 switches between a plurality of proxies. In the arrangement shown in FIG. 12B, the mobile proxy 50 must be running when the application program 12 is used.

By contrast, the environment switching program 11 of this embodiment can be applied to the arrangement shown in FIG. 12A, as shown in this figure. In this manner, since proxy setting information 13 itself can be changed by the environment switching program 11, the proxy can be switched without changing any setups of the application program 12 side. Also, the environment switching program 11 need only be launched only when the setup is to be changed, and the mobile proxy 50 need not be running unlike in FIG. 12B. Hence, proxy switching can be implemented with a lighter load on the CPU.

Figure 13:
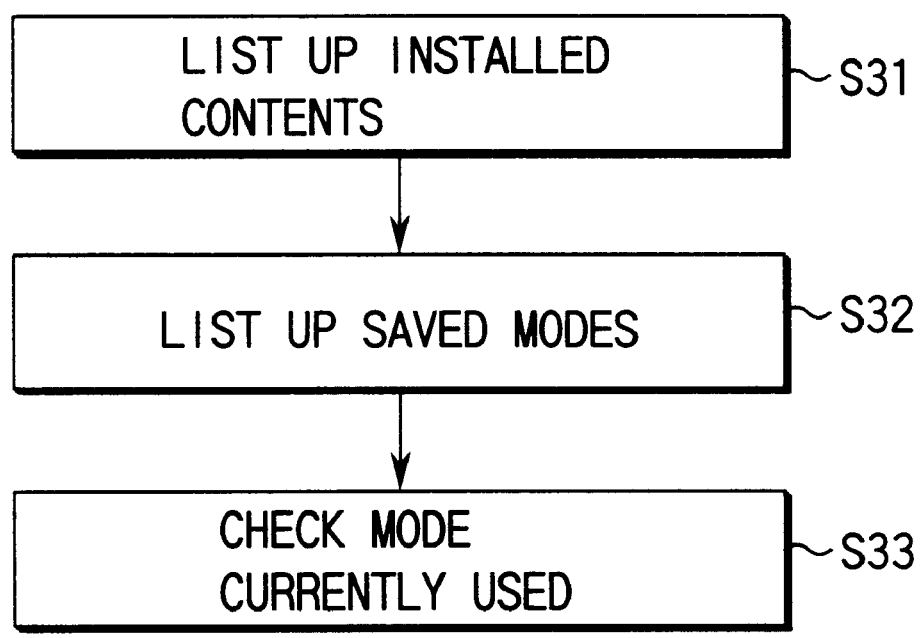
FIG. 13 is a flow chart showing the sequence of an initialization process of the environment switching program used in the embodiment shown in FIGS. 1A and 1B.

The sequence of an initialization process by the environment switching program 11 will be explained below with reference to the flow chart in FIG. 13.

(1) List up installed contents: Upon launching the environment switching program 11, individual programs installed in the personal computer are confirmed (step S31). The individual programs are provided by the OS and the like, and the user sets an item using a corresponding individual program in units of items, the setups of which are to be changed. Some individual setups supported by the environment switching program 11 can be freely installed/ uninstalled by the user. For example, a dial-up network and desktop theme are examples of such setups. Hence, effective individual programs are confirmed upon launching the environment switching program 11, and only functions corresponding to setting items, the setups of which can be changed are built in the environment switching program 11.

(2) List up saved modes: The environment switching program 11 checks all the already saved modes, and displays them on the screen (step S32).

(3) Check mode currently used: The environment switching program 11 compares the mode currently used with the current machine setups (step S33). The environment switching program in this embodiment saves the machine setups at a given timing, and the user can individually change the machine setups in units of items using individual setting programs. Therefore, the "current model" saved by the environment switching program 11 is often different from the actual machine setups. The environment switching program 11 checks the presence/absence of differences by this comparison, and if a change or changes in setup are found, the program informs the user of it. In this case, the user can select one of 1) to revert to the previous setups, 2) to record (overwrite) the latest setups again, 3) to create a new mode, and 4) to do nothing.

Figure 14:
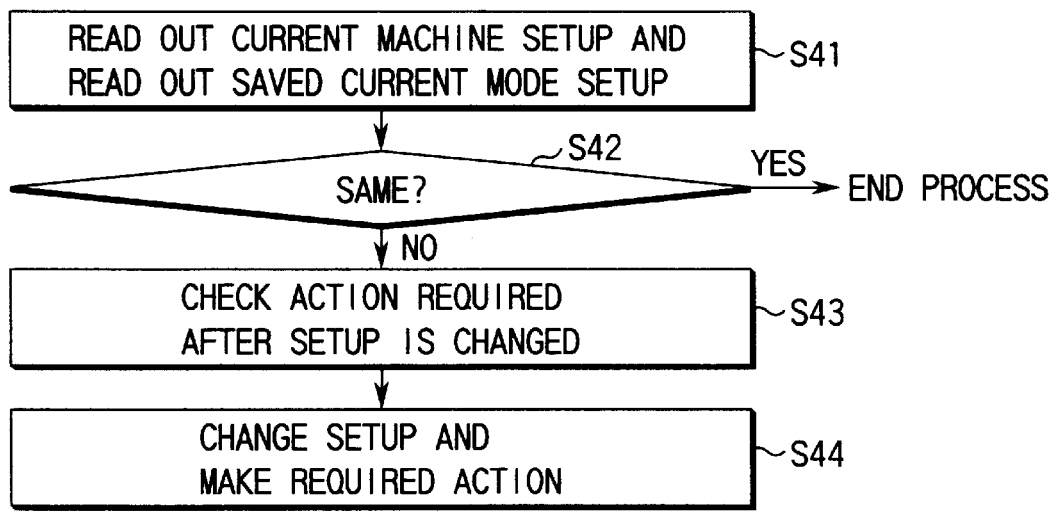
FIG. 14 is a flow chart showing the sequence of a setting change process by the environment switching program used in the embodiment shown in FIGS. 1A and 1B.

The processing sequences executed upon changing the operation environment of the personal computer and upon selecting a mode different from the current mode by the user on the window shown in FIG. 4 will be explained below with reference to the flow chart shown in FIG. 14. The difference between these two sequences is that the former sequence executes step S44 to be described later, but the latter sequence does not execute that step.

(1), (2): The environment switching program 11 (1) reads out the current machine setups from the registry 20, and (2) reads out the saved current mode setups (step S41) as pre-processes for comparison process (3). (1) and (2) have no special order.

(3): The environment switching program 11 checks if the current setups are the same as the setups to which the personal computer is to be switched (step S42). If these setups are the same, since no processes are required, the processing ends (but status information "neither restart nor re-login are required after switching" is returned to a routine that called this flow).

(4): The environment switching program 11 checks actions (restart, re-login) that must be done after resetting (step S43). The setting items of the personal computer include those which can be used immediately after they have been changed, and those which require restart or re-login to be enabled. If a process (5) in step S44 is skipped, status indicating required actions is returned to the routine that called this flow. This checking process can be implemented using a simple method of checking in turn a list including "restart is required if setup of item A has been changed", "mode can be switched without any operations if setup of item B has been changed", and so forth.

(5) After that, the environment switching program 11 actually changes the machine setups. The methods of changing the setups include:

1. a method of directly rewriting the contents of the registry 20 and sending a message indicating this to the OS;
2. a method of calling a setting change API, and making the OS itself rewrite the contents of the registry;
3. a method of rewriting setup contents unique to a model using a dedicated API;
4. a method of rewriting the contents of the registry 20, and reflecting the changed setups in the OS by restarting the computer; and
5. a method of rewriting a dedicated file (e.g., an application dependent file such as *.ini, *.cfg, or the like) of a target application.

Which method is to be used for which setup depends on the type and version of target application, and the machine condition before rewrite.

Figure 15:
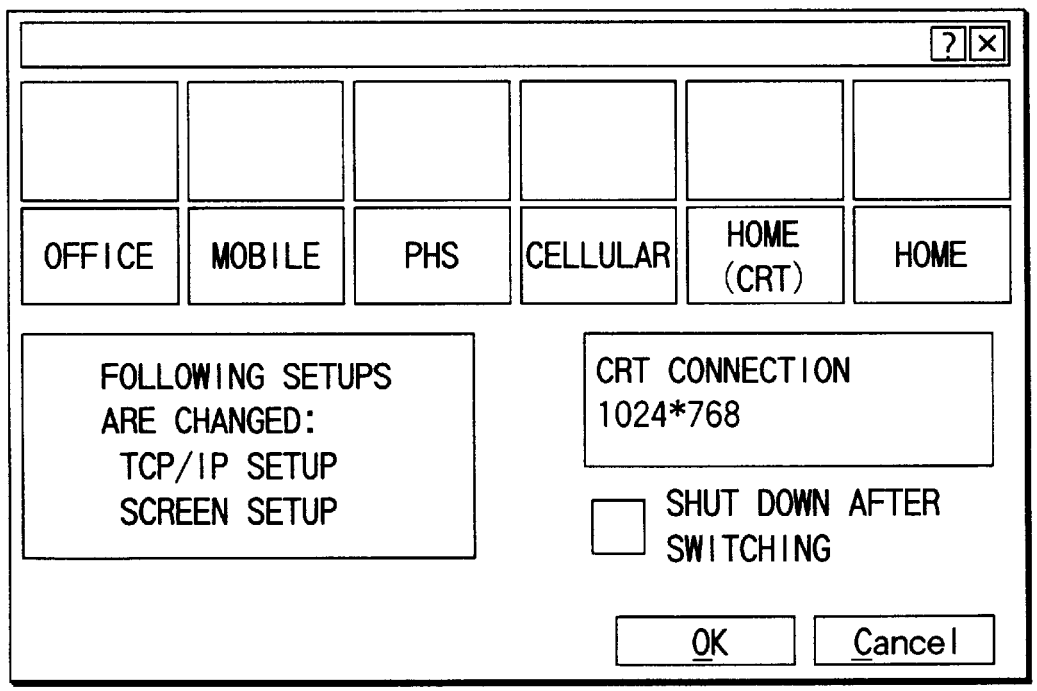
FIG. 15 shows another example of the main window presented by the environment switching program used in the embodiment shown in FIGS. 1A and 1B.

FIG. 15 shows another example of the user interface presented by the environment switching tool main block.

Note that six mode switching buttons line up on the upper portion of the window in FIG. 15. The user can assign six modes, which are most frequently used, of the saved modes to these buttons, and can easily switch the mode by pressing a desired button. Also, a message indicating setups to be changed is displayed on the window. An operation required after switching is expressed by a message "require re-login" and an icon thereabove (the appearance of the icon changes after re-login or restart).

As described above, since this embodiment can simultaneously save and reset setting information of a plurality of operation environment setting items, the setups of an operation environment can be easily changed in correspondence with various use patterns and user's favor. Hence, once the user sets up operation environments in units of use patterns such as use in an office, use at a visit place, or use at home, he or she can repetitively use those setups by reconstituting them as needed.

Especially, since a plurality of environments can be saved in units of modes, the environment can be switched to an arbitrary one of these saved modes. Therefore, the user can use the personal computer while easily selecting one of a plurality of modes, and can fully utilize the performance of the computer system in every use patterns.

Note that the environment switching program 11 of this embodiment can be introduced into various computers via recording media, and the same effects as in this embodiment can be easily obtained as long as the environment switching program 11 is installed.

To recapitulate, according to the present invention, the setups of a plurality of environment setting items can be simultaneously changed, and the setups of an operation environment can be easily changed in correspondence with various use patterns or user's favor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
    means for acquiring network setting information from the computer system;
    means for storing the acquired network setting information in a database as a current operation environment mode for setting a network environment of the computer system;
    means for displaying a menu representing an operation environment mode for selecting the network setting information stored in a data base;
    means for selecting network setting information which is designated via the displayed menu in the computer;
    means for reading the selected network setting information from the data base; and means for setting the read network setting information in the computer system.

2. A computer system according to claim 1, wherein the means for setting the read network setting information includes means for storing the read network setting information in a registry of the computer system.

3. A computer system according to claim 1, further comprising a user interface for notifying a user of the current operation environment mode to be stored in the data base.

4. A computer system according to claim 1, further comprising a user interface for notifying a user of environment setting information in the current operation environment mode to be stored in the data base.

5. A computer system according to claim 1, wherein the means for setting sets the read network setting information in the computer system when the read network setting information is not set in the computer system.

6. A computer system comprising:
    means for storing environment setting information in a data base at each operation environment mode;
    means for displaying a menu representing each operation environment mode for selecting the environment setting information stored in the data base;

means for selecting environment setting information which is designated via the displayed menu in the computer;

means for setting the selected environment setting information in a registry of the computer system to change environment setting information of a current operation environment mode;

means for acquiring environment setting information from the registry to store environment setting information in the current operation environment mode;

means for checking whether or not the acquired environment setting information corresponds to environment setting information of the current operation environment mode, which is stored in the data base; and means for rewriting the acquired environment setting information in the registry as the current operation environment mode in accordance with a check result of the means for checking.

7. A computer system comprising:

means for acquiring current network setting information from a registry of the computer system, to store current network setting information in a current operation environment mode;

means for storing the acquired current network setting information in a data base as the current operation environment mode;

means for displaying a menu representing an operation environment mode for selecting network setting information stored in the data base;

means for selecting network setting information which is designated via the displayed menu in the computer;

means for acquiring the selected network setting information from the data base; and means for setting the selected acquired network setting information in the registry of the computer system.

8. A computer system according to claim 7, further comprising:

means for checking whether or not setup of the registry can be changed, wherein the means for setting the acquired network setting information sets the acquired network setting information in the registry of the computer system in accordance with a result of the means for checking.

9. A computer system according to claim 7, wherein the menu represents operation environment modes including the operation environment mode for selecting the network setting information.

* * * * *

UNITED STATES PATENT AND TRADEMARK OFFICE
CERTIFICATE OF CORRECTION

PATENT NO. : 6,757,821 B1 Page 1 of 1
DATED : June 29, 2004
INVENTOR(S) : Akiyama et al.

It is certified that error appears in the above-identified patent and that said Letters Patent is hereby corrected as shown below:

Title page,
Item [54], delete the title in its entirety and insert therefor:
-- A SYSTEM FOR ACQUIRING AND STORING NETWORK SETTING INFORMATION TO BE SELECTED FROM AND SET WITHIN A COMPUTER --.

Signed and Sealed this

Seventeenth Day of August, 2004

JON W. DUDAS
*Acting Director of the United States Patent and Trademark Office*